United States Patent [19]

Kuma

[11] Patent Number: 5,194,414
[45] Date of Patent: Mar. 16, 1993

[54] METHOD OF MANUFACTURING A GAS ABSORBING ELEMENT OR A CATALYST CARRIER HAVING A HONEYCOMB STRUCTURE

[75] Inventor: Toshimi Kuma, 25-8, 3-chome Maimatsubara, Higashi-ku, Fukuoka-shi, Fukuoka-ken, Japan

[73] Assignees: Toshimi Kuma; Kabushiki Kaisha Seibu Giken, both of Fukuoka, Japan

[21] Appl. No.: 824,181

[22] Filed: Jan. 21, 1992

[30] Foreign Application Priority Data

Jan. 21, 1991 [JP] Japan .................................. 82060

[51] Int. Cl.$^5$ .................. B01D 39/20; B01J 32/00; B01J 35/04
[52] U.S. Cl. ................... 502/80; 502/439; 502/527; 55/387; 55/523; 55/524
[58] Field of Search ................ 502/80, 439, 527; 55/387, 523, 524

[56] References Cited

U.S. PATENT DOCUMENTS

| | | | |
|---|---|---|---|
| 4,416,800 | 11/1983 | Abe et al. | 502/527 X |
| 4,608,361 | 8/1986 | Kanamori et al. | 502/527 X |
| 4,886,769 | 12/1989 | Kuma et al. | 502/527 X |
| 5,057,482 | 10/1991 | Fukuda et al. | 502/527 X |

Primary Examiner—W. J. Shine
Attorney, Agent, or Firm—Staas & Halsey

[57] ABSTRACT

The present invention makes it possible to fix as much gas adsorbent or catalyst particles as possible to a gas adsorbing element or to a catalyst carrier having a honeycomb structure and also to improve the form-maintaining property of a honeycomb laminate after heat-treatment or during wet conditions so that operation becomes easy when impregnating the honeycomb laminate with a dispersion of gas adsorbent or catalyst particles. A honeycomb laminate is formed with paper including mostly ceramic fiber or glass fiber and mountain leather or with paper including mostly carbon fiber and mountain leather. The paper is then heat-treated, is impregnated with a dispersion of gas adsorbent or catalyst particles, is impregnated with a dispersion of inorganic binder such as silica sol or alumina sol, and is dried.

17 Claims, 4 Drawing Sheets

METHOD OF MANUFACTURING A GAS ABSORBING ELEMENT OR A CATALYST CARRIER HAVING A HONEYCOMB STRUCTURE

BACKGROUND OF THE INVENTION

1. Field of the Invention

The present invention relates to a manufacture of a highly efficient catalyst carrier or a gas adsorbing element having a honeycomb structure and high efficiency. The catalyst carrier or gas adsorbing element has an extremely large surface area per unit volume, has high physical strength, has no danger of separating or scattering catalyst or gas adsorbent particles during use, and has a large amount of uniformly fixed catalyst or gas adsorbent per unit volume.

2. Description of the Prior Art

It was described in Japanese Patent Publication No. 15028/1984 that a catalyst carrier is obtained by preparing paper by adding a small amount of organic fiber and binder to ceramic fiber, by laminating the papers to form a honeycomb structure, by impregnating the paper or the honeycomb laminate with colloidal silica or ethyl silicate, converting the silicon compound to silica gel to increase paper strength, especially wet strength, and then by baking the formed structure to burn and remove organic fiber and organic binder in the paper.

When impregnating the catalyst carrier obtained in the above method with a catalyst powder such as titania and zeolite in sol form and in fixing it to the catalyst carrier, it is necessary to first impregnate the laminate with silica sol, etc., and to dry it to increase the wet strength of the paper and the formed structure and to prevent distortion of the laminate at the time of impregnation. However, in such a reinforcing process minute silica gel particles having a diameter of approximately 20 m$\mu$ are already fixed to internal fiber gaps of the paper. Therefore, during a second impregnation of the paper with a dispersion of large catalyst particles having a particle diameter of several $\mu$, it is extremely difficult for catalyst particles to permeate into fiber gaps of the paper. In addition, most of the catalyst particles remain adhered to the paper surface. Therefore, it is difficult to make a catalyst carrier carry a large quantity of catalyst and at the same time the defect of occurrence of catalyst particle separation and carrying-over by the flow of process fluid while in use cannot be avoided. This is the same in a case of obtaining a gas adsorbing element by impregnating a similar honeycomb laminate with gas adsorbent and fixing the gas adsorbent to the honeycomb laminate.

SUMMARY OF THE INVENTION

It is an object of the present invention to provide a gas absorbing element or a catalyst carrier carrying a large amount of gas adsorbent or catalyst particles and having a low defect rate with respect to gas adsorbent or catalyst particles separation.

It is another object of the present invention to omit a pre-treatment impregnation process and fixing of silica gel to simplify the process and at the same time prevent a decrease in strength of the formed structure when it becomes wet by soaking in a dispersion of catalyst or gas adsorbent particles to prevent distortion.

It is another object of the present invention to obtain an efficient catalyst carrier or gas adsorbing element which can be impregnated with a large quantity of catalyst or gas adsorbent particles and to which these can be fixed, which has increased physical strength, which remarkably improves operation of a catalyst or gas adsorbent, and which has no danger of separation or carrying-over of catalyst or gas adsorbent from the honeycomb-shaped laminate even when a treating fluid has a high temperature or high velocity.

The present invention provides a method of obtaining a catalyst carrier or a gas adsorbing element having a honeycomb structure by mixing ceramic fiber and/or powder and/or glass fiber and mountain leather and binder to prepare paper. Mountain leather is a general term for clay minerals having a large amount of active hydroxyl groups on the surface, as described in Japanese Patent Publication No. 33250/1985 (laid open to the public without examination) and is sometimes called mountain cork or mountain wood. The honeycomb structure can also be obtained by mixing carbon fiber, for example, active carbon fiber and/or carbon particles, for example, active carbon particles, and mountain leather and binder to prepare paper, by adhering by adhesive a flat sheet and a corrugated sheet of the paper to obtain a single-faced corrugated sheet adhering and laminating by adhesive the single-faced corrugated sheet to obtain the same honeycomb laminate, and heat-treating the honeycomb-laminate to promote the combination of mountain leather and fiber for forming a webbing of mountain leather. The mountain leather is then sintered to remove or carbonize organic components contained in the paper and the adhesive to make the paper porous. Then by impregnating the paper with a dispersion of catalyst or gas adsorbent particles in inorganic binder sol such as silica sol and alumina sol, a large quantity of catalyst or gas adsorbent particles are fixed in inorganic fiber gaps and on the surface of the sheet obtained by the heat-treatment of paper. The paper is then dried. When low density paper having a high fiber gap rate is used, it can be impregnated with a large enough quantity of catalyst particles or gas adsorbent particles without heat-treating before the impregnation. In this case, the heat-treating process proceeds after the impregnation to prevent an outbreak of fire while the product is in use.

During impregnation, the honeycomb laminate may be impregnated first with a dispersion of catalyst or gas adsorbent particles. Then, after being dried the gaps of the catalyst or adsorbent particles and fibers can be uniformly impregnated with a dispersion of inorganic binder such as silica sol or alumina sol containing ultra-minute particles on the order of millimcrons and is dried again. During the impregnation, in one or two processes, as above-mentioned, fibers of paper or sheet and catalyst or gas adsorbent particles are firmly combined with inorganic binder such as silica, alumina and mountain leather. Therefore, a highly efficient catalyst carrier or gas adsorbing element which can endure long periods of usage without danger of separation, tearing off or accompanying carrying-over of catalyst or adsorbent particles, even during treatment with a fluid having a high temperature or high velocity, is obtained.

As above-mentioned, mountain leather is a general term for clay minerals having a large amount of active hydroxyl groups on the surface. Some examples of mountain leather are sepiolite, which is a type of water-containing magnesium silicate, and attapulgite which is a type of water-containing magnesium aluminosilicate. In the above-mentioned Japanese Patent Publication 33250, preparation of paper by adding ceramic material powder and/or fibrous material and organic binder to a mountain leather dispersion is described.

DESCRIPTION OF THE PREFERRED EMBODIMENTS

Figure 1:
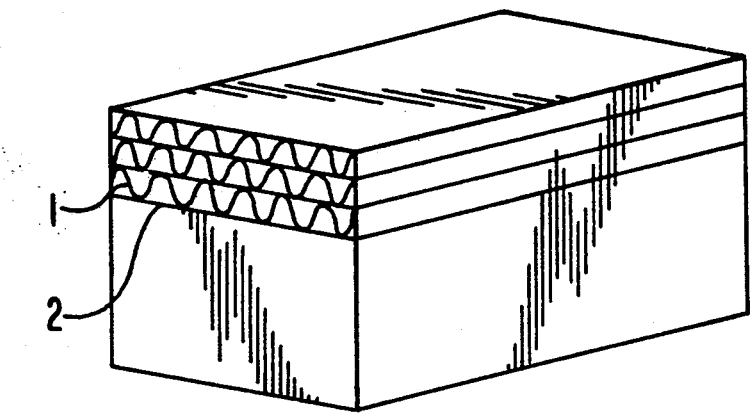
FIG. 1 is a perspective view of a honeycomb laminate as an example of a catalyst carrier or gas adsorbing element.
Figure 2:
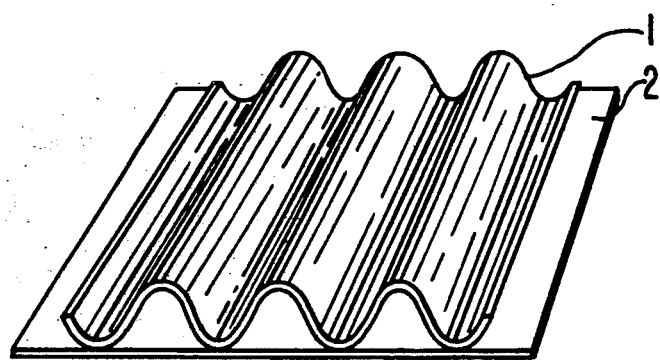
FIG. 2 is a perspective view of a single-faced corrugated sheet.

In a first embodiment of the present invention, a corrugated sheet 1 having a wavelength of 6.3 mm and a wave height of 3.5 mm is prepared using a paper 0.22 mm thick and having a weight of 80 g/m². The corrugated sheet 1 includes 100 weight parts of ceramic fiber, 10 weight parts of pulp, 30 weight parts of mountain leather and 5 weight parts of organic-inorganic mixed binder. This is adhered with a flat sheet 2 having the same composition as the above corrugated sheet 1 using an adhesive including 50% polyvinyl acetate emulsion having a 45% solid content, and 50% silica sol having a 20% solid content, to form a single-faced corrugated sheet as shown in FIG. 2. The single-faced corrugated sheets are laminated using adhesive prepared as above-mentioned by mixing organic adhesive and inorganic adhesive to obtain a honeycomb laminate 3 shown in FIG. 1. The bulk density of the honeycomb laminate 3 after drying is approximately 75 kg/m³. The honeycomb laminate 3 is then heat-treated for 5 hours in a baking furnace with hot air having an oxygen content less than 10% or with superheated steam, both having a temperature of 650° C. The bulk density of the honeycomb laminate 3 becomes approximately 61 kg/m³. The honeycomb laminate 3 is then soaked for several minutes in suspension, as a catalyst, prepared by dispersing 40% of anatase-type titanium oxide or zeolite (including hydrophobic zeolite) having a particle diameter of less than $5\mu$ in 60% silica sol (having a 20% solid content), and having a particle diameter of 10-20 m$\mu$. The honeycomb laminate 3 is then dried for approximately 60 minutes by hot air having a temperature of approximately 300° C. to obtain a honeycomb ceramic catalyst carrier or gas adsorbing element. The bulk density of the catalyst carrier or the gas adsorbing element obtained is 180 kg/m³. The quantity of the catalyst or the gas adsorbent and solid content of silica sol fixed to the honeycomb laminate is 195%.

In a second embodiment of the present invention, a corrugated sheet 1 having a wavelength of 6.3 mm and a wave height of 3.5 mm is prepared using a paper having a thickness of 0.22 mm and a weight of 80 g/m². The corrugated sheet 1 includes 90 weight parts of ceramic fiber, 10 weight parts of glass fiber, 10 weight parts of glass fiber, 10 weight parts of pulp, 30 weight parts of mountain leather and 5 weight parts of organic binder. This is adhered with a flat sheet 2 having the same composition as the corrugated sheet 1 mentioned above using adhesive consisting of 50% polyvinyl acetate emulsion having a 45% solid content, 30% silica sol having a 20% solid content, and 20% catalyst or adsorbent particles such as zeolite (having a particle diameter less than $5\mu$) to form a single-faced corrugated sheet as shown in FIG. 2. The single-faced corrugated sheets are laminated using adhesive similarly prepared as mentioned above by mixing polyvinyl acetate emulsion, silica sol and a catalyst or adsorbent particles to obtain a honeycomb laminate 3 as shown in FIG. 1. The bulk density of this honeycomb laminate 3 after drying is approximately 73.5 kg/m³. The honeycomb laminate 3 is then heat-treated in a baking furnace for 5 hours with hot air having an oxygen content less than 10%, at a temperature of 400° C. and having a velocity flow of 1.5 m/sec. The bulk density of the honeycomb laminate 3 becomes approximately 62.2 kg/m³. The honeycomb laminate 3 is then soaked for several minutes in a suspension containing approximately 30% zeolite (including hydrophobic high-silica zeolite) and having particle diameters less than $5\mu$. The honeycomb laminate 3 is then dried for approximately 60 minutes by hot air having a temperature of approximately 120° C. The bulk density of the honeycomb laminate 3 at this time is approximately 126 kg/m³. The honeycomb structure is further soaked for several minutes in silica sol containing 20% silica having a particle diameter of 10-20 m$\mu$ and is dried for 60 minutes with hot air having a temperature of 300° C. to obtain a catalyst carrier or a gas adsorbing element. The bulk density of this product is 141 kg/m³. The quantity of zeolite and silica fixed to the honeycomb laminate is 127%.

In a third embodiment according to the present invention, a corrugated sheet 1 having a wavelength of 6.3 mm and a wave height of 3.5 mm is prepared using paper having a thickness of 0.22 mm and a weight of 60 g/m²(the bulk density being 0.27 g/cm³) including 80 weight parts of ceramic fiber, 10 weight parts of ceramic powder, 10 weight parts of glass fiber, 10 weight parts of pulp, 40 weight parts of mountain leather, and 5 weight parts of organic binder. This corrugated sheet 1 is adhered with a flat sheet 2 having the same composition as the above corrugated sheet 1 using an adhesive. The adhesive includes a mixture of the same quantity of carboxyl-methyl cellulose aqueous solution having a 45% solid content and alumina sol having a 20% solid content, to form a single-faced corrugated sheet shown in FIG. 2. The single-faced corrugated sheets are laminated using adhesive comprising a mixture of inorganic and organic materials similar to those above-mentioned in the forming of the single-faced corrugated sheets to obtain a honeycomb laminate 3 shown in FIG. 1. The bulk density of this honeycomb laminate 3 after drying is approximately 73.2 kg/m³. The honeycomb laminate 3 is soaked for several minutes in the same mixture having a suspension volumes comprising approximately 30% catalyst having a particle diameter less than $5\mu$ such as vanadium pentoxide, and silica sol comprising 20% silica having a particle diameter of 10-20 m$\mu$. The honeycomb laminate 3 is then dried with hot air having a temperature of 120° C. for approximately 60 minutes and further heat-treated with hot air having a temperature of 550° C. for 5 hours to obtain a honeycomb catalyst carrier. The bulk density of the catalyst carrier obtained is 126.1 kg/m³.

In a fourth embodiment according to the present invention, an active carbon fiber paper including 50-80 weight parts of active carbon fiber having a diameter of 3-15 microns and a length of approximately 1-30 mm, 30-10 weight parts of pulp, synthetic fibers and/or glass fiber, 30-50 weight parts of mountain leather and 5 weight parts of organic binder, and having a thickness of 0.1-0.3 mm and a weight of approximately 30-150 g/m², is provided. A corrugated sheet 1 having a wavelength of 2.4–6.0 mm and a wave height of 1.3–4.0 mm of the above-mentioned active carbon fiber paper is adhered with a flat sheet 2 of the same above-mentioned active carbon fiber paper as above-mentioned using adhesive including thermoplastics such as an aqueous emulsion of polyvinyl acetate, to form a single-faced corrugated sheet shown in FIG. 2. The single-faced corrugated sheets are laminated using adhesive described above to obtain a honeycomb laminate 3 shown in FIG. 1. The honeycomb laminate 3 is soaked for several minutes in a mixture having the same suspension volumes comprising approximately 30% of active carbon particles pulverized to have a particle diameter less than 20μ and alumina sol containing 20% of alumina having a particle diameter of 10–20 mμ. Thereafter, the honeycomb laminate 3 is dried with a hot wind having a temperature of 120° C. for approximately 60 minutes, and further heat-treated with a stream of nitrogen gas at a temperature of 400°–600° C. for 5 hours to obtain a honeycomb-shaped gas adsorbing element.

In the first to third embodiments, titanium oxide, zeolite, vanadium pentoxide and active carbon particles were described. It is a matter of course that any catalyst or adsorbent which does not deteriorate by heating at the time of manufacture can be impregnated and similarly fixed.

The ceramic catalyst carrier of the honeycomb structure, which carries a large quantity of catalyst particles in the present invention, can be further impregnated with a catalyst component or other similar material, if necessary, to obtain a honeycomb catalyst for treating fluid. A fluid containing active component is passed through small channels of the honeycomb and a chemical reaction of the active component is promoted by contact with a catalyst appearing on the surface of the small channels. The gas adsorbing element obtained by the present invention is used to obtain clean air or other inert gases by alternately passing inert gas such as air containing organic solvent vapor, odor components or humidity and so on, and high temperature reactivation air through small channels of the honeycomb to continuously perform adsorption and desorption.

Because the present invention is composed as described above, in which a honeycomb laminate 3 is heat-treated with superheated steam, hot air having a decreased oxygen content or heated inactive gases containing no oxygen, each at a temperature of 400°–750° C., before the laminate is impregnated with a dispersion of a catalyst or adsorbent particles, all the organic component contained in the paper and the adhesive for lamination is decomposed, burned, carbonized or volatilized away. Therefore, the bulk density of the paper decreases and its aperture ratio increases making it possible to fix a large quantity of approximately 150% of catalyst or adsorbent particles in comparison with the weight of the honeycomb laminate 3 after heat-treating. Moreover, catalyst or adsorbent particles can be fixed or adhered firmly because all the organic component contained in the honeycomb laminate 3 is removed.

Also, in the method of the present invention, paper is used which is prepared by adding mountain leather and organic and/or inorganic binder to ceramic material or carbon material to form a honeycomb laminate. The honeycomb laminate 3 is heat-treated to remove all the organic components. Therefore, fire-resistance and heat-resistance of the honeycomb laminate increase remarkably without danger of outbreak of a fire or deterioration even under high temperatures. The honeycomb laminate is also chemically stable and has an extremely small pressure loss when treating fluid. Mountain leather forms membranes such as the webs of birds and binds with the fiber during the heat-treatment. This film-forming property of the mountain leather remarkably improves the mechanical strength of sheets of the heat-treated paper. It also improves the form maintaining quality of the honeycomb laminate under wet conditions, making an impregnating operation of a dispersion and drying at high temperature easy and also greatly improving operability of all the other manufacturing processes to shorten the entire process. The present invention also results in a simple and economical manufacture process, without requiring any special techniques. In addition, the efficiency of the fixed catalyst or adsorbent does not change because of sufficient resistance to mechanical outside forces in handling or use.

The compositions and the efficiencies of the paper shown in Example 1 and a contrasting prior art paper prepared by removing mountain leather from the paper composition are as follows:

| COMPOSITION (WEIGHT PARTS) | | | Present Invention | Contrasting Example |
|---|---|---|---|---|
| Ceramic | | | 100 | 100 |
| Pulp | | | 10 | 10 |
| Mountain leather | | | 30 | 0 |
| Binder | | | 5 | 20 |
| Weight (g/m$^2$) | | | 80.0 | 80.0 |
| Thickness (mm) | | | 0.22 | 0.22 |
| Density (g/cm$^3$) | | | 0.338 | 0.338 |
| Tensile strength | (longitudinal) | (kg/15 mm width) | 2.88 | 2.96 |
| Tensile strength | (transverse) | (kg/15 mm width) | 2.14 | 2.21 |
| Tensile strength after heat-treatment | (longitudinal) | (kg/15 mm width) | 1.56 | 0.24 |
| Tensile strength after heat-treatment | (transverse) | (kg/15 mm width) | 1.13 | 0.17 |
| Tensile strength in wet condition after heat-treatment | (longitudinal) | (kg/15 mm width) | 1.06 | unmeasurable (fleecy state) |
| Tensile strength in wet condition after heat-treatment | (transverse) | (kg/15 mm width) | 0.74 | (unmeasurable) |

Figure 3:
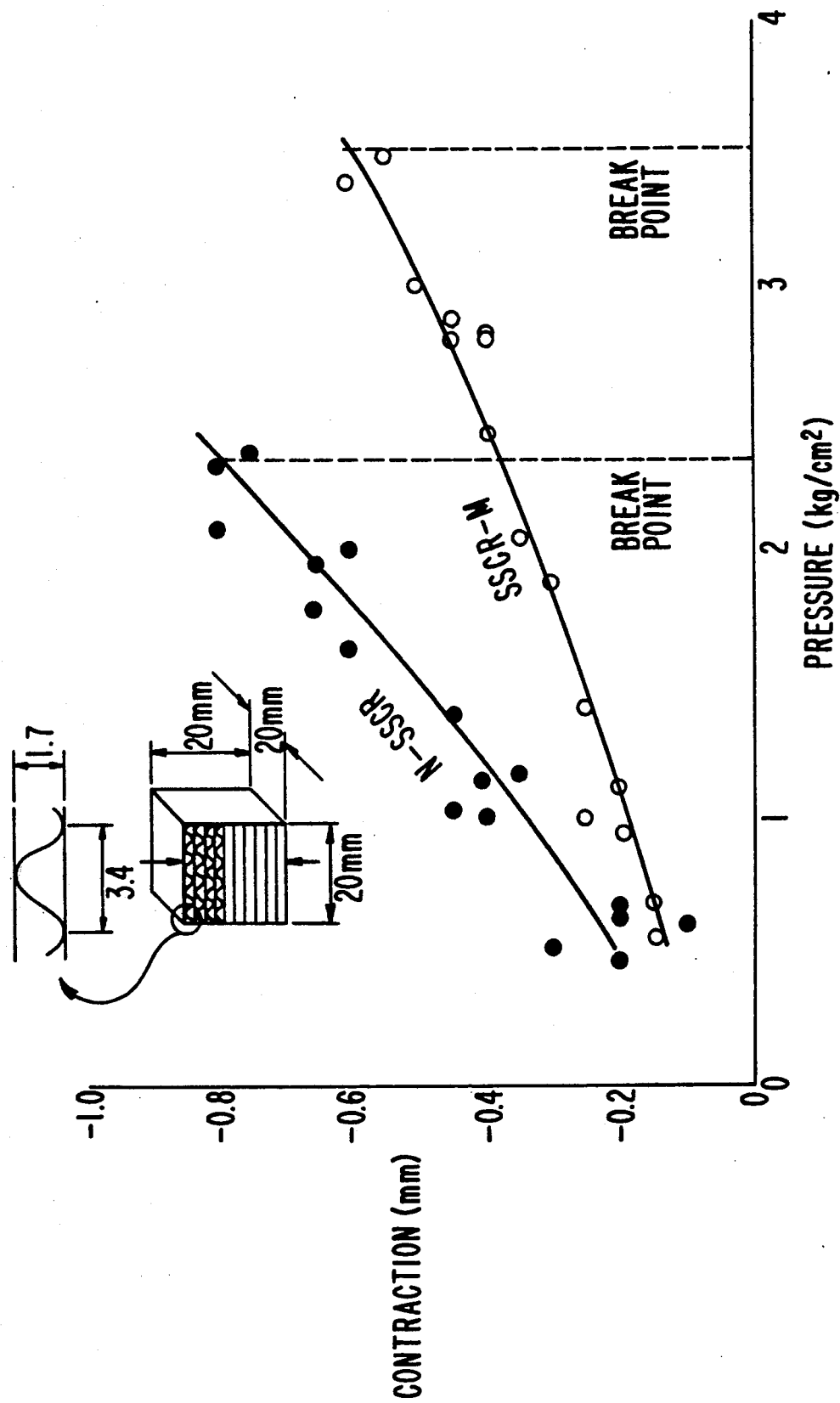
FIGS. 3, 4 and 5 are graphs showing compression strength of the honeycomb structures of the present invention with respect to prior art examples.
Figure 4:
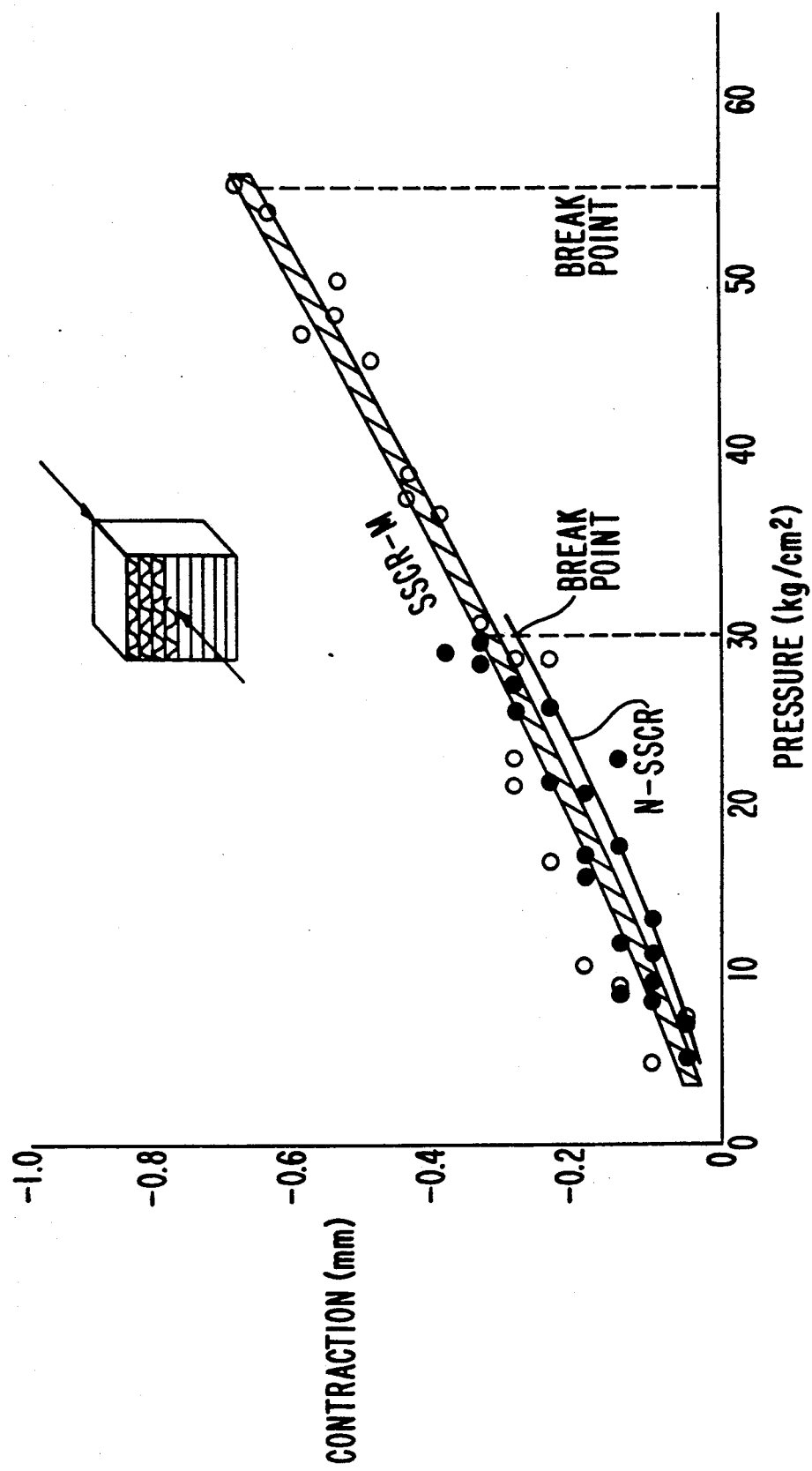
Figure 5:
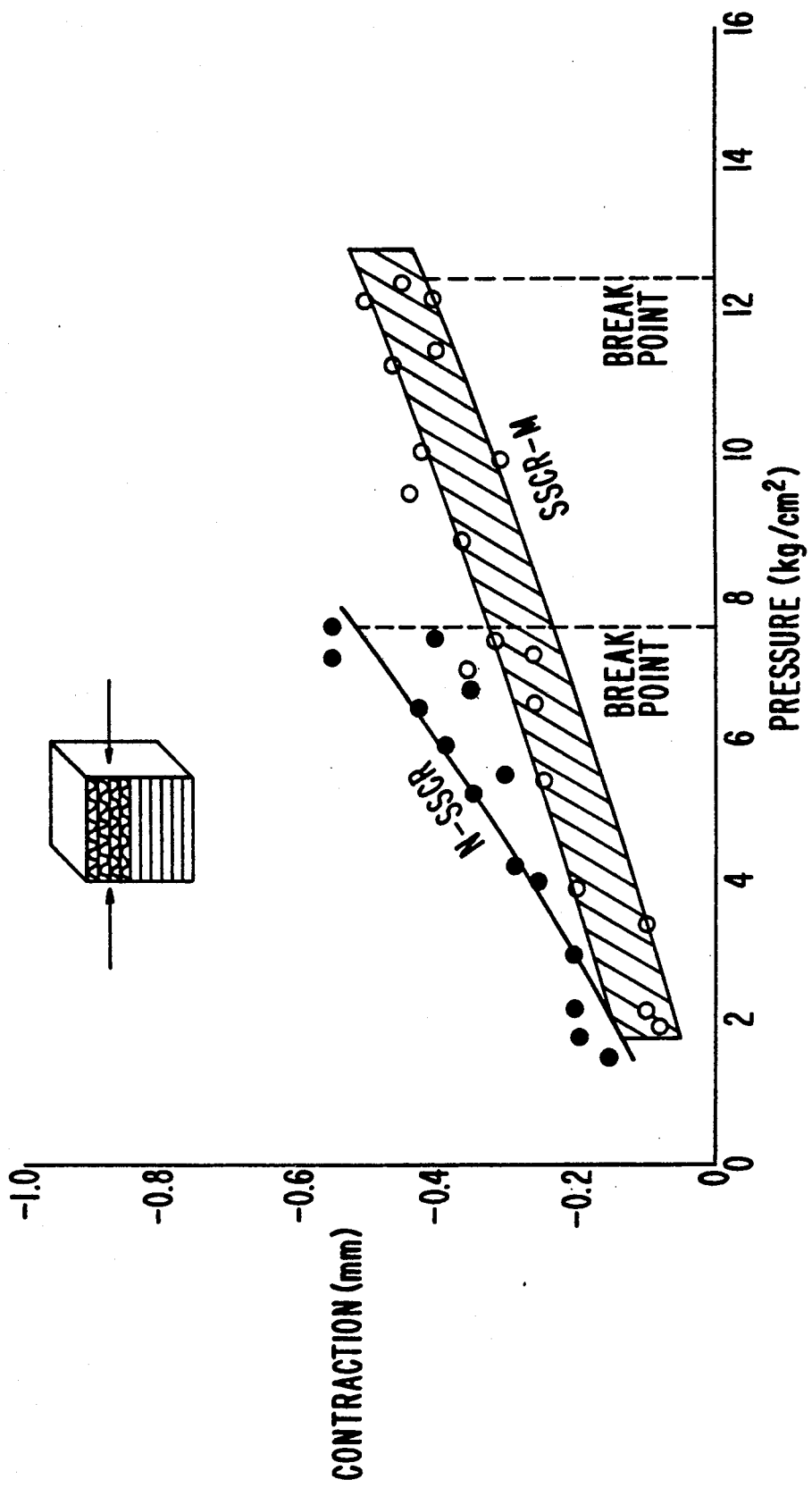

FIGS. 3–5 are graphs of results of compression tests of the honeycomb product SSCR-M produced by the first embodiment and a honeycomb product N-SSCR as a contrasting example using a paper in which mountain leather was deleted from the composition of the first embodiment and with all other conditions the same as those in the first embodiment. The wavelength of the corrugated sheets of honeycomb is 3.4 mm and the wave height is 1.7 mm (FIG. 3). As is clear from the graphs, compression strength of the honeycomb product manufactured by the present invention is superior to those of the prior art, i.e., 1.6 times in FIG. 3, 1.9 times in FIG. 4 and 1.6 times in FIG. 5.

Ceramic paper containing no mountain leather quickly loses its strength by heat-treating at high temperature because organic binder in the paper is lost. Moreover, it has a fatal defect that it becomes fleecy during wet conditions after heat-treatment, for example, at the time of impregnation, and the laminate cannot retain its form maintaining property.

In the present invention, the honeycomb laminate is impregnated with a mixed dispersion of catalyst or adsorbent particles and an inorganic binder such as silica sol or alumina sol. Therefore, inorganic binder such as silica sol or alumina sol and catalyst or adsorbent particles permeate simultaneously into fiber gaps of the paper. As the catalyst or adsorbent particles and paper fiber, together with mountain leather and inorganic binder, are treated at a high temperature, they are firmly combined by sintered mountain leather on inorganic fiber. Thus, an efficient product is obtained which can endure long periods of use without danger of separation, tearing-off or accompanying carrying-over of catalyst or adsorbent particles even during treatment with fluids having high temperatures or high velocities.

Even if the honeycomb laminate is impregnated first with a dispersion of catalyst or adsorbent particles having particle diameters on the micron order, dried, and then impregnated with a dispersion of inorganic binder such as silica or alumina consisting of ultra-fine particles having particle diameters on the millimicron order and dried, the inorganic binder having particle diameters on the millimicron order easily permeates into gaps of the catalyst or adsorbent particles on the micron order or into fiber gaps of the paper. This is due to the extreme fineness of the millimicron particle diameters of the inorganic binder. Thus, the same effect can be obtained as in the above-mentioned case of impregnating a mixed dispersion of catalyst or adsorbent particles and inorganic binder.

When a mixture of organic adhesive and inorganic adhesive is used as an adhesive in forming a single-faced corrugated sheet and/or an adhesive in laminating the single-faced corrugated sheets, organic adhesive exhibits adhesive power in the early stage in forming and laminating the single-faced corrugated sheets and inorganic adhesive exhibits adhesive power after removing organic materials by heat-treatment, thus contributing to reinforcement of the product.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to as falling within the scope of the invention in the appended claims and their equivalents.

I claim:

1. A method of manufacturing a honeycomb-shaped gas adsorbing element comprising the steps of:
   a) forming a honeycomb laminate of papers prepared from a mixture consisting of one or more of ceramic fiber, ceramic powder and/or glass fiber, and mountain leather and binder as main components and a small amount of pulp;
   b) heat-treating the honeycomb laminate with one of superheated steam, hot air with decreased oxygen content, and heated inactive gases containing no oxygen;
   c) impregnating the honeycomb laminate with a mixed dispersion of gas adsorbent particles and an inorganic binder; and
   d) drying the honeycomb laminate to fix and combine the gas adsorbent particles to fiber gaps and on the surface of the papers after heat-treating with the inorganic binder.

2. A method of manufacturing a honeycomb-shaped gas adsorbing element according to claim 1, wherein in said step c) the honeycomb laminate is impregnated with a dispersion of inorganic binder after the honeycomb laminate has been impregnated with a dispersion of gas adsorbent particles.

3. A method of manufacturing a honeycomb-shaped gas adsorbing element according to claim 1, wherein in said step c) the dispersion of inorganic binder is selected from a group consisting of silica sol and alumina sol.

4. A method of manufacturing a honeycomb-shaped gas adsorbing element, comprising the steps of:
   a) forming a honeycomb laminate of papers prepared from a mixture containing carbon fiber and/or carbon particles as main components, mountain leather and binder as main components and a small amount of pulp;
   b) heat-treating the honeycomb laminate with one of superheated steam, hot air with decreased oxygen content and heated inactive gases containing no oxygen;
   c) impregnating the honeycomb laminate with a mixed dispersion of gas adsorbent particles and an inorganic binder; and
   d) drying the honeycomb laminate to fix and combine the gas adsorbent particles to fiber gaps and on the surface of the papers after heat-treating together with the inorganic binder.

5. A method of manufacturing a honeycomb-shaped gas adsorbing element according to claim 4, wherein in said step c) the honeycomb laminate is impregnated with a dispersion of inorganic binder after the honeycomb laminate has been impregnated with a dispersion of gas adsorbent particles.

6. A method of manufacturing a honeycomb-shaped gas adsorbing element according to claim 5, wherein in said step c) the dispersion of inorganic binder is selected from a group consisting of silica sol and alumina sol.

7. A method of manufacturing a honeycomb-shaped gas adsorbing element, comprising the steps of:
   a) forming a honeycomb laminate of low density papers prepared from a mixture consisting of one or more of ceramic fiber, ceramic powder and glass fiber, and mountain leather and binder as main components and a small amount of pulp;
   b) impregnating the honeycomb laminate with a mixed dispersion of gas adsorbent particles and an inorganic binder;
   c) drying the honeycomb laminate to fix and combine the gas adsorbent particles to fiber gaps and on the surface of the papers together with the inorganic binder; and
   d) heat-treating the honeycomb laminate with one of superheated steam, hot air with decreased oxygen content and heated inactive gases containing no oxygen.

8. A method of manufacturing a honeycomb-shaped gas adsorbing element according to claim 7, wherein in said step b) the honeycomb laminate is impregnated with a dispersion of inorganic binder after the honeycomb laminate has been impregnated with a dispersion of gas adsorbent particles.

9. A method of manufacturing a honeycomb-shaped gas adsorbing element according to claim 8, wherein in said step b) the dispersion of inorganic binder is selected from a group consisting of silica sol and alumina sol.

10. A method of manufacturing a honeycomb-shaped catalyst carrier, comprising:
   a) forming a honeycomb laminate of papers prepared from a mixture consisting of one or more of ceramic fiber, ceramic powder and glass fiber, and mountain leather and binder as main components and a small amount of pulp;
   b) heat-treating the honeycomb laminate with one of superheated steam, hot air with decreased oxygen content and heated inactive gases containing no oxygen;
   c) impregnating the honeycomb laminate with a mixed dispersion of catalyst particles and an inorganic binder; and
   d) drying the honeycomb laminate to fix and combine the catalyst particles to fiber gaps and on the surface of the papers together with the inorganic binder.

11. A method of manufacturing a honeycomb-shaped catalyst carrier according to claim 10, wherein in said step c) the honeycomb laminate is impregnated with a dispersion of inorganic binder after the honeycomb laminate has been impregnated with a dispersion of catalyst particles.

12. A method of manufacturing a honeycomb-shaped catalyst carrier according to claim 11, wherein in said step c) the dispersion of inorganic binder is selected from a group consisting of silica sol and alumina sol.

13. A method of manufacturing a honeycomb-shaped catalyst carrier according to claim 10, wherein in said step c) the dispersion of inorganic binder is selected from a group consisting of silica sol and alumina sol.

14. A method of manufacturing a honeycomb-shaped catalyst carrier, comprising the steps of:
   a) forming a honeycomb laminate of low density papers prepared from a mixture consisting of one or more of ceramic fiber, ceramic powder and glass fiber, and mountain leather and binder as main components and a small amount of pulp;
   b) impregnating the honeycomb laminate with a mixed dispersion of catalyst particles and an inorganic binder;
   c) drying the honeycomb laminate to fix and combine the catalyst particles to fiber gaps and on the surface of the papers together with the inorganic binder; and
   d) heat-treating the honeycomb laminate with one of superheated steam, hot air with decreased oxygen content and heated inactive gases containing no oxygen.

15. A method of manufacturing a honeycomb-shaped catalyst carrier according to claim 14, wherein in said step b) the honeycomb laminate is impregnated with a dispersion of inorganic binder after the honeycomb laminate has been impregnated with a dispersion of catalyst particles.

16. A method of manufacturing a honeycomb-shaped catalyst carrier according to claim 15, wherein in said step b) the dispersion of inorganic binder is selected from a group consisting of silica sol and alumina sol.

17. A method of manufacturing a honeycomb-shaped catalyst carrier according to claim 14, wherein in said step b) the dispersion of inorganic binder is selected from a group consisting of silica sol and alumina sol.

* * * * *